Figure 1:
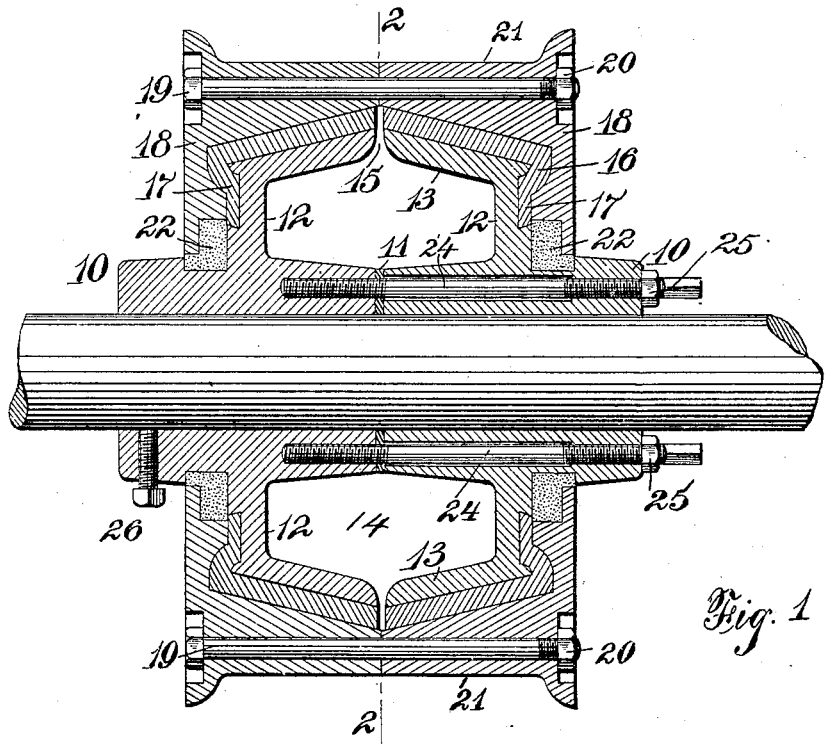

No. 835,546. PATENTED NOV. 13, 1906.
C. MOORE.
LOOSE PULLEY.
APPLICATION FILED APR. 3, 1906.

WITNESSES:
E. A. Pell
Ralph Lancaster

INVENTOR
Charles Moore
BY
Wm. H. Caufield
ATTORNEY

THE NORRIS PETERS CO., WASHINGTON, D. C.

UNITED STATES PATENT OFFICE.

CHARLES MOORE, OF ELIZABETH, NEW JERSEY.

LOOSE PULLEY.

No. 835,546.  Specification of Letters Patent.  Patented Nov. 13, 1906.

Application filed April 3, 1906. Serial No. 309,592.

*To all whom it may concern:*

Be it known that I, CHARLES MOORE, a citizen of the United States, residing at Elizabeth, in the county of Union and State of New Jersey, have invented certain new and useful Improvements in Loose Pulleys; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention refers to a loose pulley, and is of that class that has a portion fixed to the shaft and has a rim portion that rotates on the fixed portion.

One object of the invention is to provide a device of this kind that is split transversely of the axis of the pulley, and the fixed interior portion is arranged to be spread when occasion requires to take up wear on the friction portion of the device and prevent the pulley from having an unsteady motion.

The invention is illustrated in the drawings, in which—

Figure 2:
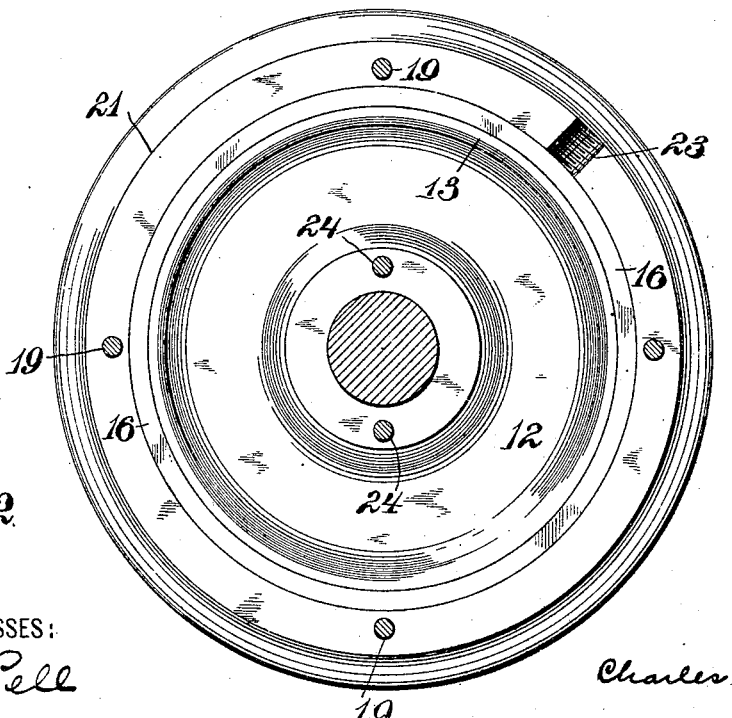

Figure 1 is a vertical section of the device, and Fig. 2 is a section on line 2 2 in Fig. 1.

The portion that is fixed to the shaft is made up of two members 10, that abut in the center onto a filling-piece or gasket 11 and have the side walls 12 and the peripheral rims 13 to form an oil-chamber 14. It will be understood that these pieces 10 do not abut on the ends of the rims 13, but separate enough to form an annular oil-channel 15 to feed oil to both sides of the filling 16, which may be of any suitable material, such as Babbitt metal, this Babbitt metal extending down on either side, as at 17, to provide for the side friction on either side of the fixed portion of the device, and outside the Babbitt metal are arranged the rotating portions 18, which abut at the center, being held by the bolts 19 and the nuts 20.

The face 21 provides surface for the reception of a belt.

Between the fixed portion 10 and the movable portion 18 is arranged a packing 22 to prevent the escape of oil from between the Babbitt metal and the portion 18. Each of the pieces 18 can also be provided with a cut-away portion 23, these portions coming in register when the pulley is assembled and being screw-threaded for the reception of a plug. This opening allows for filling the oil-chamber 14 and can be stopped with the aforesaid plug until another filling is necessary.

It will be noticed that the rim of the inner portions 10 and the inner surface of the portions 18 are arranged to slant or taper toward the outside. This is done so that when the wear on the Babbitt metal becomes appreciable in an unsteadiness or wabbling of the pulley the two portions 10 are spread apart to take up the wear, this being accomplished on account of the slanting surface aforesaid. I show one means in the drawing of doing this, consisting of the right and left threaded bolts 24, which can be locked by means of the nuts 25, and these bolts acting when turned to draw together or spread apart the sections 10, according to the rotation of the bolts. These bolts can also be provided with squared ends to furnish means for operating them.

The sections 10 can be secured to the shaft by either the usual key or by means of a set-screw 26.

Having thus described my invention, what I claim is—

1. A loose pulley comprising a fixed portion made of two members, means for regulating the distance between the members, the members being grooved on their opposed faces and cut away to form an annular groove on the rim, a Babbitt-metal covering on the rim and sides of the fixed portion, and a movable portion on the fixed portion covering the Babbitt metal on the fixed portion.

2. A pulley comprising a portion split transversely, means for expanding the split portions, an encircling member split transversely and permanently secured on the fixed portion, Babbitt metal between the annular and side contacting surfaces of the encircling member and the fixed member, and a right and left hand screw arranged in the two members of the fixed portion to regulate the distance between them.

3. A pulley comprising a fixed portion formed of two members, each member having a hub portion, a side wall and a tapered rim portion, the rim portions of the members extending toward one another and coming in close proximity, Babbitt metal on the outside of the rims and sides of the fixed portion, and an encircling member arranged to rotate on the Babbitt metal, and means on the two members of the fixed portion to regulate the distance between them.

In testimony that I claim the foregoing I have hereunto set my hand this 31st day of March, 1906.

CHARLES MOORE.

Witnesses:
WM. H. CAMFIELD,
E. A. PELL.